United States Patent
Chasey

(10) Patent No.: US 8,227,534 B2
(45) Date of Patent: Jul. 24, 2012

(54) METAL SULFIDES IN POWER-CABLE INSULATION

(75) Inventor: Kent L. Chasey, Wichita, KS (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 266 days.

(21) Appl. No.: 12/620,892

(22) Filed: Nov. 18, 2009

(65) Prior Publication Data

US 2010/0160524 A1 Jun. 24, 2010

Related U.S. Application Data

(60) Provisional application No. 61/138,820, filed on Dec. 18, 2008.

(51) Int. Cl.
*C08K 3/30* (2006.01)

(52) U.S. Cl. .......... 524/302; 524/418; 524/420

(58) Field of Classification Search ........... 524/302, 524/420, 418
See application file for complete search history.

(56) References Cited

U.S. PATENT DOCUMENTS

| | | | |
|---|---|---|---|
| 2,972,600 A | 2/1961 | Braidwood | |
| 3,287,440 A | 11/1966 | Giller | |
| 3,535,257 A * | 10/1970 | Abraham | 524/305 |
| 4,311,628 A | 1/1982 | Abdou-Sabet et al. | |
| 5,656,693 A | 8/1997 | Ellul et al. | |
| 6,433,090 B1 | 8/2002 | Ellul et al. | |
| 2004/0079547 A1 * | 4/2004 | Rodway et al. | 174/110 PM |
| 2007/0134506 A1 | 6/2007 | Chasey et al. | |
| 2009/0081151 A1 | 3/2009 | Toyoda et al. | |
| 2009/0247719 A1 | 10/2009 | Ennis | |
| 2010/0160514 A1 * | 6/2010 | David et al. | 524/301 |

FOREIGN PATENT DOCUMENTS

EP 0 862 187 A1 * 9/1998

OTHER PUBLICATIONS

"Periodic Table of the Elements," Chemical and Engineering News, vol. 63, Issue (5), p. 27 (1985).

* cited by examiner

*Primary Examiner* — Robert D. Harlan
(74) *Attorney, Agent, or Firm* — Hsin Lin; Leandro Arechederra, III

(57) ABSTRACT

An insulation compound for a medium-voltage power cable, comprising a polymer comprising ethylene and one or more $C_3$-$C_8$ alpha olefins; and one or more metal sulfides.

12 Claims, No Drawings

METAL SULFIDES IN POWER-CABLE INSULATION

CROSS REFERENCE TO RELATED APPLICATION

This application claims priority to application Ser. No. 61/138,820, filed Dec. 18, 2008, and application Ser. No. 12/610,717, filed Nov. 2, 2009, the disclosures of which are hereby incorporated by reference in their entireties.

FIELD OF THE INVENTION

Embodiments of the present invention generally relate to polymeric compositions including metal sulfides in the use of these compositions for power-cable insulation.

BACKGROUND OF THE INVENTION

Thermoset medium-voltage insulation compounds that have been used in 5,000 to 39,000 volt transmission and distribution cable, and higher voltage cables as well, have been based on cross-linked (also referred to as cured) polyethylene (PE) homopolymers, copolymers of ethylene and alpha olefins such as propylene, butene, or octene (EP, EB, EO), and terpolymers of ethylene, propylene, and a diene (EPDM). Any of those thermoset compounds are subject to in-service polymer oxidation or ionic contamination, which can result in a breakdown of their electrical performance.

Polymer oxidation is electrochemical oxidation, and typically involves a two-step process. First, ground water often migrates through the cable jacket and the semiconductive insulation layer of the cable to contact the polymer. Second, electrical stresses at the polymer/water interface initiate a series of free-radical reactions, which lead to the decomposition of the water and the oxidation of polymer. Ionic contamination can result from (a) invasion of ionic species via ground-water ingress, as well as (b) concentration of residual ionic species in the thermoset compound.

Additives capable of reducing electrochemical oxidation by precipitation or complexation of undesirable ions may have a beneficial impact on in-service cable performance. Medium-voltage insulation compounds, which are based on either ethylene-propylene copolymer or EPDM often contain, as a preferred ingredient, lead tetraoxide, $Pb_3O_4$. Lead tetraoxide has been shown to improve wet-electrical performance in these types of cables by preventing electrochemical oxidation. However, environmental concerns about the disposal of lead-containing chemicals or materials have resulted in efforts to develop replacements for lead tetraoxide in medium voltage insulation.

There is a need, therefore, for environmentally acceptable methods and systems to reduce or eliminate electrochemical oxidation in power cables.

SUMMARY OF THE INVENTION

One or more embodiments of the present invention include an insulation compound for a medium-voltage power cable comprising a polymer comprising ethylene and one or more $C_3$-$C_8$ alpha olefins; and one or more metal sulfides.

Other embodiments of the present invention include an insulation compound for a medium-voltage power cable comprising at least one elastomer comprising ethylene and one or more $C_3$-$C_8$ alpha olefins; zinc oxide; and of from 1 to 10 phr zinc sulfide.

Other embodiments of the present invention provide a medium-voltage power cable, comprising an insulative layer comprising at least one elastomer comprising ethylene, propylene and ethylidene norbornene, wherein the ethylene content is of from 50 wt % to 80 wt %, based on total weight of the elastomer, and the ethylidene norbornene content is of from 1 wt % to 7 wt %, based on total weight of the elastomer; zinc oxide; and of from 1 phr to 10 phr of one or more sulfides.

DETAILED DESCRIPTION OF THE INVENTION

Embodiments of the invention are based on the discovery of power-cable insulation including metal sulfides. Metal sulfides have been found to reduce polymer oxidation (e.g., electrochemical oxidation) in power-cable insulation, particularly those used for medium-voltage applications. Accordingly, embodiments of this invention are directed toward medium-voltage cables having an insulator that includes a metal sulfide dispersed throughout a polymer.

As used herein, the term "power cable coating composition" or simply "compound" refers to a polymer component or components in combination with fillers, accelerants, curatives, extenders and other components commonly used in the art to form a material having the requisite processing, heat aging, electrical and other properties suitable for use as an insulative coating layer in an electrical cable.

As used herein, the term "polymer" includes homopolymers, copolymers, interpolymers, terpolymers, etc. The term "polymer" also refers to one or more polymers regardless of the method, time, and apparatuses used to combine the polymers. Additionally, the term "polymer" can be used to refer to polymeric compositions.

The term "filler" refers to one or more inorganic particulate fillers such as carbon black, lead, clay, calcined clay, silane treated calcined clay, talc, calcium carbonate, mica, silica, zinc oxides, titanium oxides, magnesium oxides, combinations thereof, and the like.

Ethylene Alpha-Olefin Diene Rubber

The power cable coating composition can be or include one or more ethylene-alpha-olefin-diene polymers, elastomers, or simply "rubber." Such polymers can include ethylene; an alpha olefin, such as propylene; and at least one non-conjugated diene. Non-conjugated dienes useful as co-monomers preferably are straight or branched chain hydrocarbon di-olefins or cycloalkenyl-substituted alkenes, having about 6 to about 15 carbon atoms, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Preferred non-conjugated dienes are 5-ethylidene-2-norbornene (ENB), 1,4-hexadiene, dicyclopentadiene (DCPD), norbornadiene, and 5-vinyl-2-norbornene (VNB), with ENB being most preferred.

The elastomer can contain ethylene-derived units ("ethylene content") in an amount ranging from a lower limit of 50, or 60, or 65, or 68 wt % to an upper limit of 80 or 85 or 90 wt %, based on the total weight of the polymer. The diene content of the elastomer can range of from a lower limit of 0.1 or 0.16 wt % to an upper limit of 0.4, or 1.5, or 5 wt %, based on the total weight of the polymer.

The elastomer can also be characterized by a Mooney viscosity (ML [1+4] 125° C.) of from 10 to 80, and a molecular weight distribution (Mw/Mn) of greater than 6, or greater than 10.

The elastomer can have a molecular weight distribution Mw/Mn of greater than 3, or greater than 6, or greater than 10. Molecular weight distribution (MWD) is a measure of the range of molecular weights within a given polymer sample. Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

The elastomer can also have a branching index (g') within the range having a lower limit of 0.05, or 0.1 and an upper limit of 0.3, or 0.4, or 0.5, or 0.7, or 0.8, or 0.9, or 1.0, or 1.5. The branching index g' is defined as:

$$g' = \frac{[\eta]_{avg}}{kM_v^\alpha}$$

where, "k" and "α" are the Mark Houwink coefficients for a linear polymer of the same chemical species. For example, α=0.695 for ethylene, propylene, and butene polymers; and k=0.000579 for ethylene polymers, k=0.000262 for propylene polymers, and k=0.000181 for butene polymers. $M_v$ is the viscosity-average molecular weight based on molecular weights determined by LS analysis. The average intrinsic viscosity, $[\eta]_{avg}$, of the sample is defined as:

$$[\eta]_{avg} = \frac{\Sigma c_i [\eta]_i}{\Sigma c_i}$$

where the summations are over the chromotographic slices, i, between the integration limits.

In one or more embodiments, the power cable coating composition contains one or more ethylene-alpha-olefin-diene elastomers in an amount of from 40 wt % to 99 wt %, based on total weight of the composition. In one or more embodiments, one or more ethylene-alpha-olefin-diene elastomers are present in an amount ranging from a low of about 45 wt %, 55 wt %, or 65 wt % to a high of about 75 wt %, 85 wt %, or 95 wt %, based on total weight of the composition.

Ethylene Alpha-Olefin Polymer

In one or more embodiments, the power cable coating composition can be or include one or more ethylene alpha-olefin polymers. Suitable ethylene alpha-olefins are metallocene-catalyzed polymers of ethylene and an alpha-olefin comonomer, the alpha-olefin being a $C_3$-$C_{20}$ alpha-olefin and preferably a $C_3$-$C_{12}$ alpha-olefin. The alpha-olefin comonomer can be linear or branched, and two or more comonomers can be used, if desired. Examples of suitable alpha-olefin comonomers include propylene, linear $C_4$-$C_{12}$ alpha-olefins, and alpha-olefins having one or more $C_1$-$C_3$ alkyl branches. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene, or 1-dodecene. Preferred comonomers include ethylene, 1-butene, 1-pentene, 3-methyl-1-butene, 1-hexene, 3-methyl-1-pentene, 4-methyl-1-pentene, 3,3-dimethyl-1-butene, 1-heptene, 1-hexene with a methyl substituent on any of $C_3$-$C_5$, 1-pentene with two methyl substituents in any stoichiometrically acceptable combination on $C_3$ or $C_4$, 3-ethyl-1-pentene, 1-octene, 1-pentene with a methyl substituent-on any of $C_3$ or $C_4$, 1-hexene with two methyl substituents in any stoichiometrically acceptable combination on $C_3$-$C_5$, 1-pentene with three methyl substituents in any stoichiometrically acceptable combination on $C_3$ or $C_4$, 1-hexene with an ethyl substituent on $C_3$ or $C_4$, 1-pentene with an ethyl substituent on $C_3$ and a methyl substituent in a stoichiometrically acceptable position on $C_3$ or $C_4$, 1-decene, 1-nonene, 1-nonene with a methyl substituent on any of $C_3$-$C_9$, 1-octene with two methyl substituents in any stoichiometrically acceptable combination on $C_3$-$C_7$, 1-heptene with three methyl substituents in any stoichiometrically acceptable combination on $C_3$-$C_6$, 1-octene with an ethyl substituent on any of $C_3$-$C_7$, 1-hexene with two ethyl substituents in any stoichiometrically acceptable combination on $C_3$ or $C_4$, and 1-dodecene. It should be appreciated that the list of comonomers above is merely exemplary, and is not intended to be limiting. A particularly preferred comonomer is octene.

The ethylene alpha-olefin polymer can have one or more of the following characteristics:
(i) a molecular weight distribution Mw/Mn ranging from a lower limit of 1.5 or 1.8 to an upper limit of 40, or 20, or 10, or 5, or 3;
(ii) a Composition Distribution Breadth Index (CDBI) greater than 50% or greater than 60% or greater than 65%;
(iii) a Melt Index Ratio $I_{10}/I_2$ ranging from a lower limit of 5, or 7, or 8 to an upper limit of 9 or 10; and
(iv) a Melt Index Ratio $I_{21}/I_2$ ranging from a lower limit of 20, or 25, or 30 to an upper limit of 40, or 45, or 50.

Examples of suitable ethylene alpha-olefins include several of the polymers sold under the trademark EXACT and available from ExxonMobil Chemical Co., as well as the ENGAGE polymers available from Dow. Particular EXACT polymers include, but are not limited to EXACT 0201, EXACT 021HS, EXACT 0203, EXACT 8201, EXACT 8203, EXACT 210, and EXACT 8210. Typical ethylene alpha-olefins will have a density within the range having a lower limit of 0.86 g/cm$^3$, or 0.87 g/cm$^3$, or 0.88 g/cm$^3$ and an upper limit of 0.91 g/cm$^3$, or 0.92 g/cm$^3$, or 0.94 g/cm$^3$; and a melt index I2 of from a lower limit of 0.1, or 0.5, or 1.0 dg/min to an upper limit of 10, or 50, or 100 dg/min, consistent with the Melt Index Ratios described above.

In one or more embodiments, the power cable coating composition contains one or more ethylene-alpha-olefins in an amount of from 40 wt % to 99 wt %, based on total weight of the composition. In one or more embodiments, one or more ethylene-alpha-olefins are present in an amount ranging from a low of about 40 wt %, 50 wt %, or 60 wt % to a high of about 70 wt %, 80 wt %, or 90 wt %, based on total weight of the composition.

Rubber Curing Agent

Any curative that is capable of curing or crosslinking the elastomer can be used. Depending on the elastomer employed, certain curatives may be preferred. Illustrative curatives include, but are not limited to, phenolic resins, peroxides, maleimides, sulfur containing curatives, and silicon-containing curatives. Suitable phenolic resins are described in U.S. Pat. Nos. 2,972,600; 3,287,440; 4,311,628; and 6,433,090. A preferred phenolic resin curative is an octylphenol-formaldehyde resin sold commercially as SP-1045 from Schenectady International, Inc. Suitable peroxide curatives are disclosed in U.S. Pat. No. 5,656,693. Useful silicon-containing curatives include silicon hydride compounds having at least two SiH groups. Illustrative silicon hydride compounds include, but are not limited to, methylhydrogen polysiloxanes, methylhydrogen dimethyl-siloxane copolymers, alkyl methyl polysiloxanes, bis(dimethylsilyl)alkanes, bis(dimethylsilyl)benzene, and mixtures thereof.

Metal Sulfides

Suitable metal sulfides can include one or more metal cations selected from the following categories in the Periodic Table of the Elements: Group 1, Group 2, Group 3, Group 12, Group 13, Group 14, Group 15, the first transition series, the second transition series, and the lanthanide series. In one or more embodiments, the metal cation of the sulfide is non-paramagnetic. As used herein, the numbering scheme for the categories in the Periodic Table of the Elements refers to the new notation as set out in Chemical and Engineering News, 63(5), 27 (1985).

Particular Group 13 sulfides include, but are not limited to, boron sulfide ($B_2S_3$). Particular Group 14 sulfides include, but are not limited to, germanium disulfide ($GeS_2$).

Particular Group 15 sulfides include, but are not limited to, bismuth (III) sulfide ($Bi_2S_3$) and antimony (V) sulfide ($Sb_2S_5$). Particular metal sulfides from the first transition series, include but are not limited to, manganese (II) sulfide (MnS), manganese (III) sulfide ($Mn_2S_3$), iron disulfide ($FeS_2$), copper (I) sulfide ($Cu_2S$), copper (II) sulfide (CuS), and zinc sulfide (ZnS). One particular metal sulfide from the lanthanide series includes, but is not limited to, cerium (III) sulfide ($Ce_2S_3$). An example of a metal sulfide from the second transition series is molybdenum (IV) disulfide ($MoS_2$). Other particular metal sulfides can include derivatives such as sodium or other salts such as, but not limited to, sodium sulfide ($Na_2S$) and sodium hydrosulfide (NaHS).

The above-mentioned sulfides, similar to the lead sulfides (PbS, and $PbS_2$), are believed to exhibit the effect of interfering with either of two oxidation processes: autooxidation during hot-air oven aging of polymer, or electrochemical oxidation during field aging of cable, but are not environmentally restricted. In particular, these sulfides may stabilize or react with either (a) the alkylperoxy radical intermediate, which is believed to form by reaction of oxygen with an alkyl (polymeric) carbon-centered radical, and which should be common to both processes, or (b) the alkyl hydroperoxide intermediate, which is believed to form by hydrogen abstraction, and which should be common to both processes. The ability of a sulfide to inhibit polymeric oxidation in either of these oxidation processes can be a function of many factors, including, but not limited to, the acidic, basic, or amphoteric nature of the sulfide, the valence state and the coordination number of the metal, cation radius, oxygen radius, and the resulting radius ratio, structural defects, cation vacancies, and oxygen vacancies in the sulfide, the ionic/covalent nature of the bonding in the sulfide, the isoelectric point of the sulfide, and the thermodynamics affecting the formation of oxygenated species on the surface of the sulfide.

In one or more embodiments, the power cable coating composition contains one or more sulfides in an amount ranging from about 1 to about 10 parts by weight per 100 parts by weight of rubber (phr). In one or more embodiments, the sulfide is present in an amount ranging from a low of about 1, 2, or 3 phr to a high of about 7, 8.5, or 9.9 phr. In one or more embodiments, the sulfide is present in an amount greater than 1.0 phr and less than 10.0, 9.0, 8.0, 7.0, 6.0, 5.0, 4.0, 3.0, 2.0 or 1.5 phr.

Other Additives

The term "other additives" may include, but is not limited to, particulate fillers, lubricants, antioxidants, antiblocking agents, stabilizers, anti-degradants, anti-static agents, waxes, foaming agents, pigments, flame retardants, processing aids, adhesives, tackifiers, plasticizers, wax, and discontinuous fibers (such as wood cellulose fibers). Exemplary particulate fillers are carbon black, silica, titanium dioxide, calcium carbonate, colored pigments, clay, and combinations thereof. When non-black fillers are used, it may be desirable to include a coupling agent to compatibilize the interface between the non-black fillers and polymers. Desirable amounts of carbon black, or other particular fillers, when present, are from about 5 to about 250 phr. The power cable coating composition can include up to 10 wt % one or more antioxidants. Useful antioxidants can include one or more metal sulfides and/or one or more non-metal sulfides. For particular embodiments, the antioxidant does not contain lead (Pb). In these or other embodiments, the compositions of this invention are devoid, or in other embodiments substantially devoid, of lead.

Cable Coating

The compounds can be formed using conventional mixing and extrusion techniques. In one or more embodiments, the compounds are used as an insulator in a medium-voltage electrical or power cable. As is generally known in the art, a power cable may include, in combination, a conductor (generally two or more electrical conductors) and an insulator. The insulation typically forms a sheath around the conductor(s). The term "medium voltage" refers to voltages less than 35 kV, and includes voltages of from 4 Kv to 35 kV; of from 5 Kv to 35 kV; of from 6 Kv to 35 kV; and of from 7 Kv to 35 kV. In a particular embodiment, the power cable coating composition is a medium voltage cable compound that meets the Insulated Cable Engineers Association (ICEA) specifications for medium voltage compounds. These specifications include:

(a) Electrical properties: dielectric constant of less than 4.0, and dissipation factor of less than 0.015 (ASTM D150-98);

(b) Physical properties: tensile strength greater than 8.2 MPa, and elongation to break greater than 250% (ASTM D412-92);

(c) Heat aging properties: greater than 80% tensile retention and greater than 80% elongation retention after aging for 14 days at 121° C. (ExxonMobil Chemical Co. test procedure); and/or (d) No gels: an absence of gelation regions in excess of 0.254 mm (ExxonMobil Chemical Co. test procedure).

Further embodiments include:

1. An insulation compound for a medium-voltage power cable, comprising:
   a polymer comprising ethylene and one or more $C_3$-$C_8$ alpha olefins; and
   one or more metal sulfides.

2. The compound of claim 1, wherein the compound further comprises one or more curing agents.
3. The compound of claim 2, wherein the curing agent comprises one or more peroxides.
4. The compound of claim 2, wherein the curing agent is dicumyl peroxide.
5. The compound of any of claims 1-4, wherein the polymer further comprises one or more non-conjugated dienes.
6. The compound of claim 5, wherein the non-conjugated diene is vinyl norbornene or ethylidene norbornene.
7. The compound of any of claims 1-6, wherein the polymer is a terpolymer comprising ethylene, propylene and vinyl norbornene.
8. The compound of any of claims 1-6, wherein the polymer is a terpolymer comprising ethylene, propylene and ethylidene norbornene.
9. An insulation compound for a medium-voltage power cable, comprising:
   at least one elastomer comprising ethylene and one or more $C_3$-$C_8$ alpha olefins;
   zinc oxide; and
   from 1 to 10 phr zinc sulfide.
10. The compound of claim 9, wherein the compound further comprises one or more curing agents.
11. The compound of claim 10, wherein the curing agent comprises one or more peroxides.
12. The compound of claim 10, wherein the curing agent is dicumyl peroxide.
13. The compound of any of claims 9-12, wherein the polymer further comprises one or more non-conjugated dienes.
14. The compound of claim 13, wherein the non-conjugated diene is vinyl norbornene or ethylidene norbornene.
15. The compound of any of claims 9-14, wherein the elastomer is a terpolymer comprising ethylene, propylene, and vinyl norbornene.
16. The compound of any of claims 9-14, wherein the elastomer is a terpolymer comprising ethylene, propylene, and ethylidene norbornene.
17. A medium-voltage power cable, comprising:
   an insulative layer comprising:
      at least one elastomer comprising ethylene, propylene and ethylidene norbornene, wherein the ethylene content is of from 50 wt % to 80 wt %, based on total weight of the elastomer, and the ethylidene norbornene content is of from 1 wt % to 7 wt %, based on total weight of the elastomer;
      zinc oxide; and
      from 1 phr to 10 phr of one or more sulfides.
18. The cable of claim 17, wherein the metal sulfide is zinc sulfide.

EXAMPLES

The foregoing discussion can be further described with reference to the following non-limiting examples. Table 1 contains the formulation for an insulation compound that was screened for its usefulness as a power-cable insulator.

TABLE 1

| Vistalon 8731 EPDM | 100.0 phr |
| Zinc Sulfide (Additive) | 2.5 phr |
| DiCup 40KE (dicumyl peroxide) | 3.3 phr |
| Total: | 105.8 phr |

VISTALON 8731 is an EPDM rubber that is commercially available from ExxonMobil Chemical Company. VISTALON 8731 has a Mooney viscosity, ML (1+4) 125° C. of 24 (ASTM D-1646, modified), an ethylene content of 75.8 wt % (ASTM D-3900-B, modified), and an ethylidene norbornene (END) content of 3.3 wt % (ASTM D-6047).

The dicumyl peroxide (DiCup) was supplied by Geo Specialty Chemicals.

A plaque specimen for heat-aging was prepared by vulcanization of the sample at 180° C. for 10 minutes, and the plaque was treated in a hot-air oven at 125° C. for 72 hours. An Attenuated Total Reflection Fourier Transform Infrared (ATR FTIR) procedure was employed that measures the extent of oxidation of the sample specimens by measuring the hydrocarbon absorbance at 2848 wavenumbers and carbonyl absorbance at 1711 wavenumbers. The differences in both absorption values before and after aging for each specimen were recorded. The results of these tests are provided in Table 2.

TABLE 2

|  | Carbonyl Absorbance at 1,711 $cm^{-1}$ | Hydrocarbon Absorbance at 2,848 $cm^{-1}$ |
| --- | --- | --- |
| Original Sample | 0.003 | 0.329 |
| Heat-aged Sample | 0.022 | 0.306 |

The use of zinc sulfide as the additive resulted in a resistance to oxidation, which was indicated by the minimal loss in hydrocarbon absorbance and the minimal development of carbonyl absorbance. And, as those skilled in the art appreciate, these values are at least an order of magnitude lower than would be observed in the absence of an antioxidant. As a result, there is a strong indication that zinc sulfide may be used in medium-voltage insulation.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:
1. An insulation compound for a medium-voltage power cable, comprising:
   a polymer comprising mer units from ethylene, one or more $C_3$-$C_8$ alpha olefins, and one or more non-conjugated dienes;
   a curing agent; and
   one or more metal sulfides.

2. The compound of claim 1, wherein the curing agent comprises one or more peroxides.

3. The compound of claim 1, wherein the curing agent is dicumyl peroxide.

4. The compound of claim 1, wherein the non-conjugated diene is vinyl norbornene or ethylidene norbornene.

5. The compound of claim 1, wherein the polymer is a terpolymer comprising ethylene, propylene and vinyl norbornene.

6. The compound of claim 1, wherein the polymer is a terpolymer comprising ethylene, propylene and ethylidene norbornene.

7. An insulation compound for a medium-voltage power cable, comprising:
   at least one elastomer comprising mer units from ethylene, one or more $C_3$-$C_8$ alpha olefins, and one or more non-conjugated dienes;
   a curing agent;
   zinc oxide; and
   from 1 to 10 phr zinc sulfide.

8. The compound of claim 7, wherein the curing agent comprises one or more peroxides.

9. The compound of claim 7, wherein the curing agent is dicumyl peroxide.

10. The compound of claim 7, wherein the non-conjugated diene is vinyl norbornene or ethylidene norbornene.

11. The compound of claim 7, wherein the elastomer is a terpolymer comprising ethylene, propylene, and vinyl norbornene.

12. The compound of claim 7, wherein the elastomer is a terpolymer comprising ethylene, propylene, and ethylidene norbornene.

* * * * *